(12) United States Patent
Mizuma

(10) Patent No.: US 6,810,766 B2
(45) Date of Patent: *Nov. 2, 2004

(54) BRAKE PEDAL APPARATUS FOR VEHICLE

(75) Inventor: Hiroyuki Mizuma, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 22 days.

This patent is subject to a terminal disclaimer.

(21) Appl. No.: 10/130,390

(22) PCT Filed: Jul. 13, 2001

(86) PCT No.: PCT/JP01/06084

§ 371 (c)(1),
(2), (4) Date: May 14, 2002

(87) PCT Pub. No.: WO02/22412

PCT Pub. Date: Mar. 21, 2002

(65) Prior Publication Data

US 2003/0019319 A1 Jan. 30, 2003

(30) Foreign Application Priority Data

Sep. 14, 2000 (JP) .......................... 2000-280836

(51) Int. Cl.[7] ................................................ G05G 1/14
(52) U.S. Cl. .......................................... 74/512; 74/560
(58) Field of Search ......................... 74/560, 512, 513, 74/514, 516

(56) References Cited

U.S. PATENT DOCUMENTS

| | | | |
|---|---|---|---|
| 6,101,894 A | * | 8/2000 | Tiemann et al. ............... 74/512 |
| 6,112,616 A | * | 9/2000 | Schonlau et al. ............. 74/512 |
| 6,142,036 A | * | 11/2000 | Mizuma et al. ............... 74/512 |
| 6,176,340 B1 | * | 1/2001 | Mizuma et al. ............. 180/274 |
| 6,209,416 B1 | * | 4/2001 | Tiemann et al. ............... 74/512 |
| 6,279,417 B1 | * | 8/2001 | Mizuma et al. ............... 74/512 |
| 6,336,376 B1 | * | 1/2002 | Lee .............................. 74/512 |
| 6,408,711 B1 | * | 6/2002 | Mizuma et al. ............... 74/512 |
| 2003/0029267 A1 | * | 2/2003 | Aoki et al. ................... 74/560 |

FOREIGN PATENT DOCUMENTS

| | | |
|---|---|---|
| DE | 19737114 A | 5/1999 |
| EP | 0928727 A | 7/1999 |
| EP | 1065114 A | 1/2001 |
| EP | 1106458 A | 6/2001 |
| JP | 6-1113 | 1/1994 |

* cited by examiner

Primary Examiner—David A. Bucci
Assistant Examiner—Bradley J. Van Pelt
(74) Attorney, Agent, or Firm—McDermott Will & Emery LLP

(57) ABSTRACT

A brake pedal apparatus for a vehicle is provided with a pedal bracket having a pivot shaft, a pivot bracket having a pedal shaft, a pedal arm, a slide plate fixed to a body structural member of the vehicle and located between the body structural member and the pedal bracket, an impact absorbing section, and a rotational motion assisting section. The impact absorbing section permits relative movement of the pivot bracket and the body structural member in a longitudinal direction of the vehicle when the pedal bracket encounters an external force directed rearward of the vehicle at a level beyond a predetermined load, in such a manner that the pivot bracket disengages from the slide plate to allow the pivot bracket to rotate about the pivot shaft while rotating the pedal shaft therewith rearwardly downward of the vehicle. Also, the rotational motion assisting section is normally held in an inoperative position, and operable to be brought into abutting engagement with at least one of the body structural member and the slide plate to promote rotational movement of the pivot bracket about the pivot shaft caused by the impact absorbing section.

16 Claims, 4 Drawing Sheets

BRAKE PEDAL APPARATUS FOR VEHICLE

TECHNICAL FIELD

The present invention relates to a brake pedal apparatus for a vehicle such as an automotive vehicle.

BACKGROUND ART

In recent years, various improvement work has been undertaken to provide a brake system for a vehicle, more specifically, a brake pedal apparatus for a vehicle such as an automotive vehicle, one typical example of which is disclosed in Japanese Utility Model Application Laid-Open Publication No. H6-1113. In such a brake pedal apparatus, a pedal bracket, which pivotally supports an upper portion of a pedal arm, is fixedly connected to a dash floor panel and a lower portion of a dash upper panel connected to the dash floor panel and protruding into a vehicle compartment, with depression of the pedal arm allowing a push rod, which is connected to an upper portion of the pedal arm, to move forward to render a master vac. of the brake system operative.

DISCLOSURE OF INVENTION

In such a structure of the brake pedal apparatus, in the event that the master vac. having a master cylinder and the dash floor panel, to which the master vac. is fixed, are moved and deformed rearward of the vehicle during a frontal collision of the vehicle, the pedal arm encounters a movement in a direction opposite to a depressing direction of the pedal arm through the push rod of the master vac., with a depressible position of the brake pedal being dislocated from its usual position to an undesired uncomfortable position to provide a differential feeling touch to a driver in the vehicle.

The present invention has been made in view of the above-described studies by the present inventor and has an object to provide a brake pedal apparatus for a vehicle wherein a pedal arm is effectively prevented from being subjected to impact load through a push rod of a master vac. during a frontal collision of the vehicle for thereby effectively avoiding a differential feeling touch to be given to a driver of the vehicle.

According to one aspect of the present invention, there is provided a brake pedal apparatus for a vehicle provided with a dash panel and a body structural member located upwardly rearward of the dash panel in the vehicle. The brake pedal apparatus includes: a pedal bracket having a side wall connected to the dash panel, an upper wall connected to an upper end of the side wall, and a pivot shaft mounted to the side wall, the upper wall being attached to the body structural member; a pivot bracket pivotally supported on the pivot shaft and having a pedal shaft located forward of the pivot shaft in the vehicle; a pedal arm pivotally supported on the pedal shaft; a slide plate attached to the body structural member and located between the body structural member and the pedal bracket, the pivot bracket being normally held in engagement with the slide plate; an impact absorbing section permitting relative movement of the pivot bracket and the body structural member in a longitudinal direction of the vehicle when the pedal bracket encounters an external force directed rearward of the vehicle at a level beyond a predetermined load, in such a manner that the pivot bracket disengages from the slide plate to allow the pivot bracket to rotate about the pivot shaft while rotating the pedal shaft therewith rearwardly downward of the vehicle; and a rotational motion assisting section formed on the pivot bracket and normally held in an inoperative position, the rotational motion assisting section being operable to be brought into abutting engagement with at least one of the body structural member and the slide plate to promote rotational movement of the pivot bracket about the pivot shaft caused by the impact absorbing section.

In other words, with respect to the present invention, a brake pedal apparatus for a vehicle includes: a pedal bracket having a side wall connected to the dash panel, an upper wall connected to an upper end of the side wall, and a pivot shaft mounted to the side wall, the upper wall being attached to the body structural member; a pivot bracket pivotally supported on the pivot shaft and having a pedal shaft located forward of the pivot shaft in the vehicle; a pedal arm pivotally supported on the pedal shaft; a slide plate attached to the body structural member and located between the body structural member and the pedal bracket, the pivot bracket being normally held in engagement with the slide plate; permitting means for permitting relative movement of the pivot bracket and the body structural member in a longitudinal direction of the vehicle when the pedal bracket encounters an external force directed rearward of the vehicle at a level beyond a predetermined load, in such a manner that the pivot bracket disengages from the slide plate to allow the pivot bracket to rotate about the pivot shaft while rotating the pedal shaft therewith rearwardly downward of the vehicle; and promoting means for promoting rotational movement of the pivot bracket about the pivot shaft caused by the permitting means when the promoting means is operable to be brought into abutting engagement with at least one of the body structural member and the slide plate.

Other and further features, advantages, and benefits of the present invention will become more apparent from the following description taken in conjunction with the following drawings.

BEST MODE FOR CARRYING OUT THE INVENTION

Figure 1:
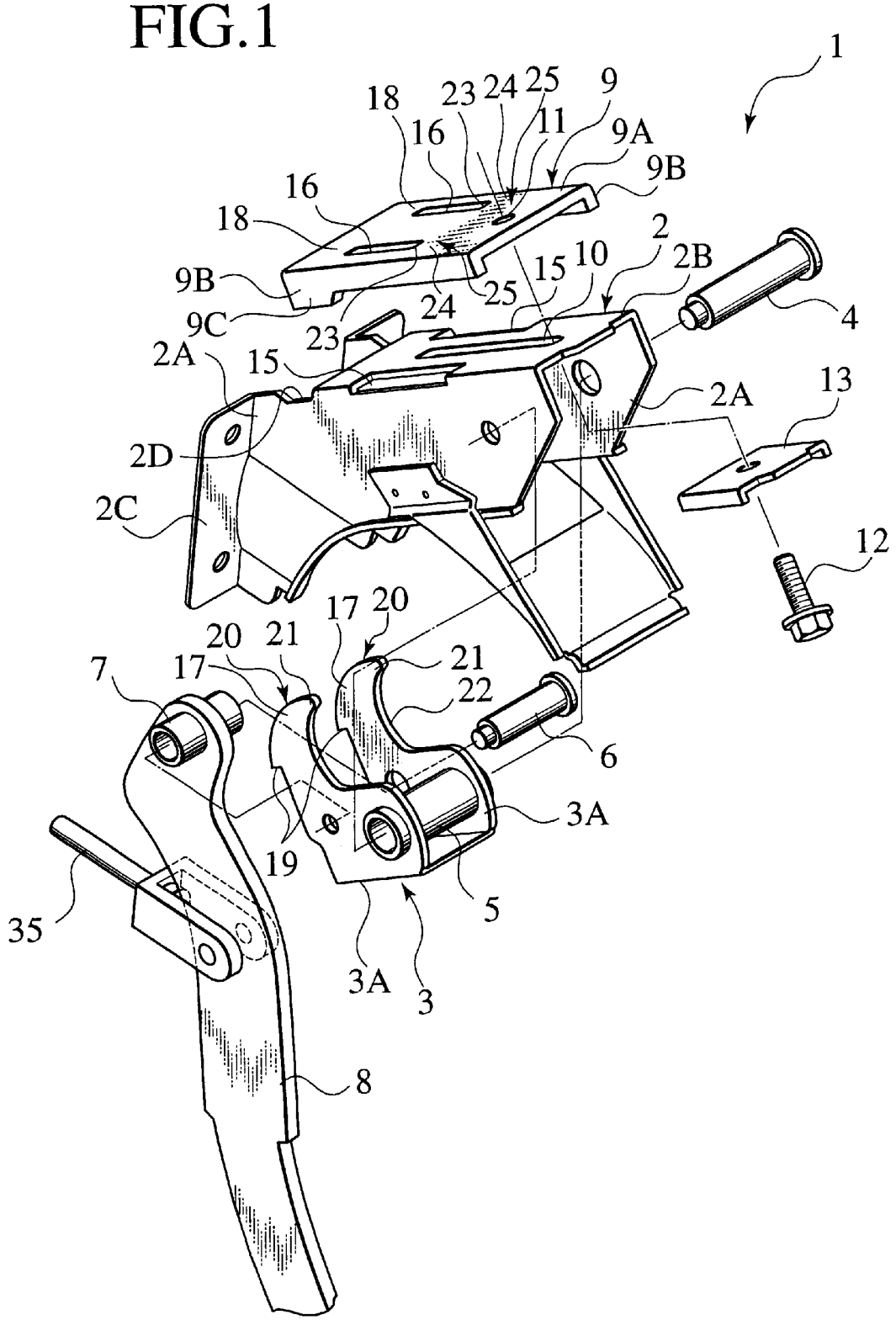
FIG. 1 is a perspective exploded view of an embodiment of a brake pedal apparatus for a vehicle according to the present invention.

To describe the present invention more in detail, an embodiment of the present invention will be explained with reference to the accompanying drawings below.

Referring now to FIGS. 1 to 4, there is shown a brake pedal apparatus 1 for a vehicle V such as an automotive vehicle of the embodiment according to the present invention. The brake pedal apparatus 1 includes a pedal bracket 2 which has a pair of flange portions 2C, 2C firmly fixed to a dash floor panel 30 of a dash panel formed in a front portion of the vehicle by bolts and nuts (not shown). Incidentally in FIG. 2, an arrow FR indicates the forward direction of the vehicle, and an arrow UPR indicates the upward direction of the vehicle.

The pedal bracket 2 has a pair of side wall portions 2A, 2A which are laterally spaced from one another and are interconnected at their upper ends with an upper wall portion 2B, thereby forming a substantially C-shaped configuration in cross section. Upper ends of respective side wall portions 2A, 2A of the pedal bracket 2 have at their forward end portions cutouts 2D, 2D which will be discribed below. The upper wall portion 2B has a pair of elongated openings 15, 15 formed in the vicinity of the cutouts 2D, 2D, and a central elongated bolt insertion hole 10 formed in a longitudinal direction (lengthwise) of the pedal bracket 2. The elongated bolt insertion hole 10 functions as an impact absorbing section which maintains the pedal bracket 2 in a first retaining position shown in FIGS. 2 and 3A during a normal driving state of the vehicle and in a second retaining position shown in FIGS. 3B and 4 during a frontal collision of the vehicle, in a manner as will be described below in detail.

A substantially flat, slide plate 9 is placed over the upper wall portion 2B of the pedal bracket 2 at a rearward area thereof and firmly fixed to a lower wall of a lower bracket portion 32 of a vehicular body structural member (a body structural member) 31 such as a dash upper panel D which is joined to an upper distal end of the dash floor panel 30 and which extends rearward in a vehicle compartment C in the longitudinal direction (forward and rearward direction) of the vehicle.

As best shown in FIG. 1, more specifically, the slide plate 9 has a dish-shaped configuration having an upper wall 9A and at its both sides, laterally spaced downwardly extending flanges 9B, 9B to just like cover the upper wall portion 2B of the pedal bracket 2. A forward end of each downwardly extending flanges 9B, 9B has a downward protrusion 9C, 9C at a forward area of the slide plate 9. Further, the slide plate 9 has a bolt insertion hole 11 formed in a central position at a rearmost position thereof, a pair of laterally spaced, elongated openings 16, 16 formed with forward end portions 18, 18 (engaging edge portions) of the upper wall 9A, and a pair of stopper sections 24, 24 respectively defined on the upper wall 9A at an area between rearward edges 23, 23 of the respective elongated openings 16, 16 and the bolt insertion hole 11. The pedal bracket 2 is attached to the bracket portion 32 of the vehicular body structural member 31 by a bolt 12 and a nut 14 while the slide plate 9 being as like sandwiched between the upper wall portion 2B of the pedal bracket 2 and the bracket portion 32 of the vehicular body structural member 31. The bolt 12 is fastened with the nut 14 through the elongated bolt insertion hole 10 of the pedal bracket 2 and the bolt insertion hole 11 of the slide plate 9 with a plate member 13 inserted between a bottom surface of the upper wall portion 2B and a head portion of the bolt 12.

A pivot bracket 3, which has a substantially C-shaped configuration in cross section, has a collar 5 which is pivotally supported on a pivot shaft 4 mounted to the pedal bracket 2. The pivot bracket 3 has a laterally spaced side plate portions 3A, 3A which carry a pedal shaft 6 at a position forward of the pivot shaft 4 in the longitudinal direction of the vehicle, with the pedal shaft 6 pivotally supporting a pedal arm 8 through a collar 7 of the pivot bracket 3. The pivot bracket 3 includes a rotational motion assisting section 20 composed of upper projections 17, 17 extending upward through the elongated openings 15, 15 of the pedal bracket 2 and the elongated openings 16, 16 of the slide plate 9. The rotational motion assisting section 20 functions to normally engages with the slide plate 9 to remain in a first operative position, shown in FIGS. 2 and 3A, wherein the pedal bracket 2 remains in its first retaining position, and also is operative to disengage from the slide plate 9 to assist rotational movement, that is, rotational movement of the pivot bracket 3 as viewed in FIGS. 3A and 4, such that the pedal bracket 2 is brought into the second retaining position shown in FIG. 4 through the transit situation shown in FIG. 3B, in a manner as will be described below in detail.

In such a structure, provision of the pedal bracket 2 formed with the elongated bolt insertion hole 10 renders the impact absorbing section to be operative to allow the pedal bracket 2 to move rearward in the vehicle compartment relative to the slide plate 9 and the bracket portion 32 of the body structural member 31 when the pedal bracket 2 encounters an external force applied in the rearward direction of the vehicle under a predetermined load during frontal collision of the vehicle.

In such a structure also, the upper wall portion 2B of the pedal bracket 2 has the pair of elongated openings 15, 15 and the upper wall 9A of the slide plate 9 has the pair of elongated opening 16, 16, and such elongated openings 15, 15 and elongated openings 16, 16 receive the upper projections 17, 17 of the rotational motion assisting section 20. With such an arrangement, cutout portions 19, 19, which are formed at forward distal ends of the respective upper projections 17, 17 of the pivot bracket 3, are held in engagement with forward end portions (engaging edge portions) 18, 18 of the respective elongated openings 16, 16.

Figure 2:
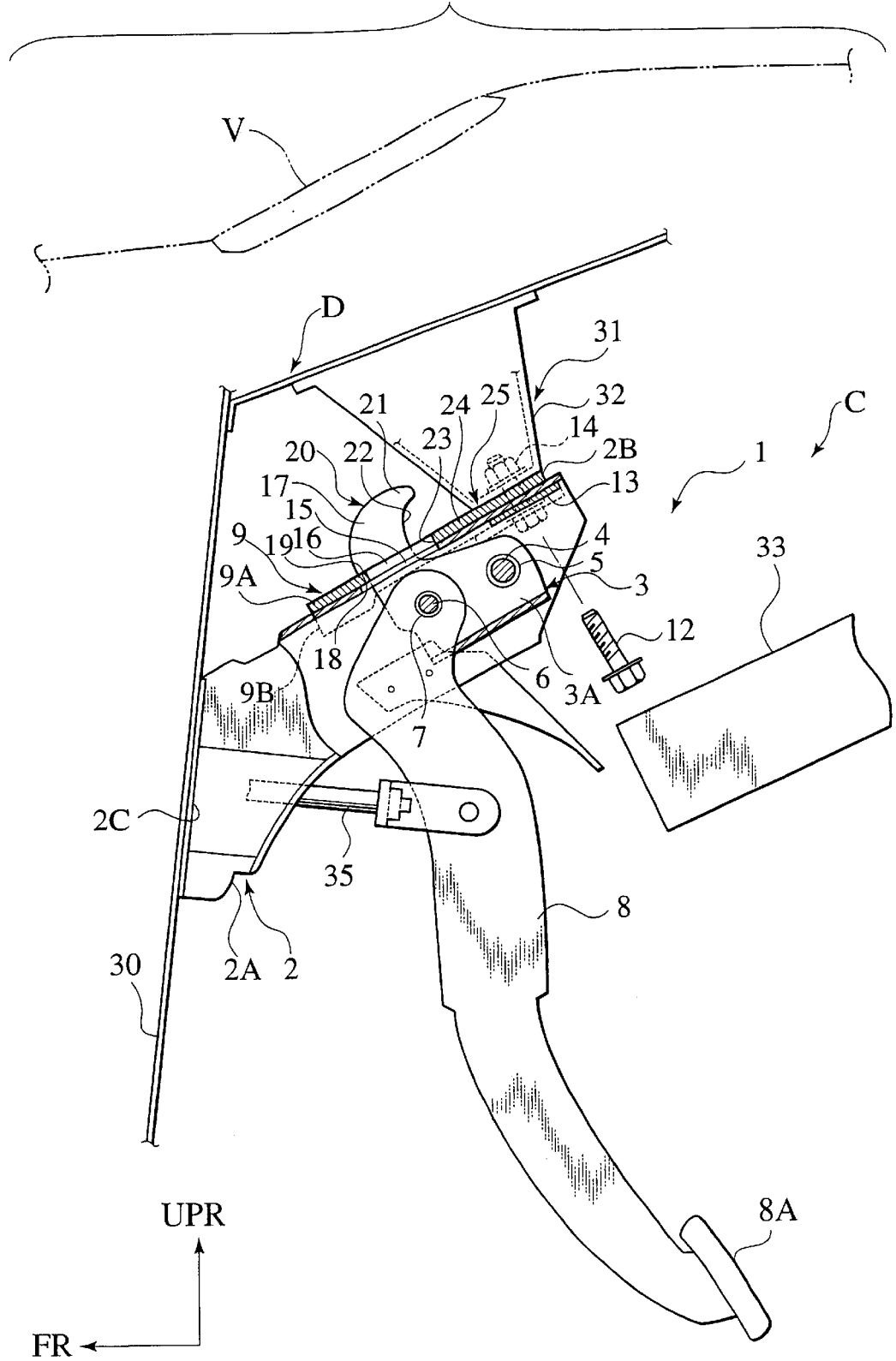
FIG. 2 is a cross sectional side view of the brake pedal apparatus according to the embodiment.
Figure 3A:
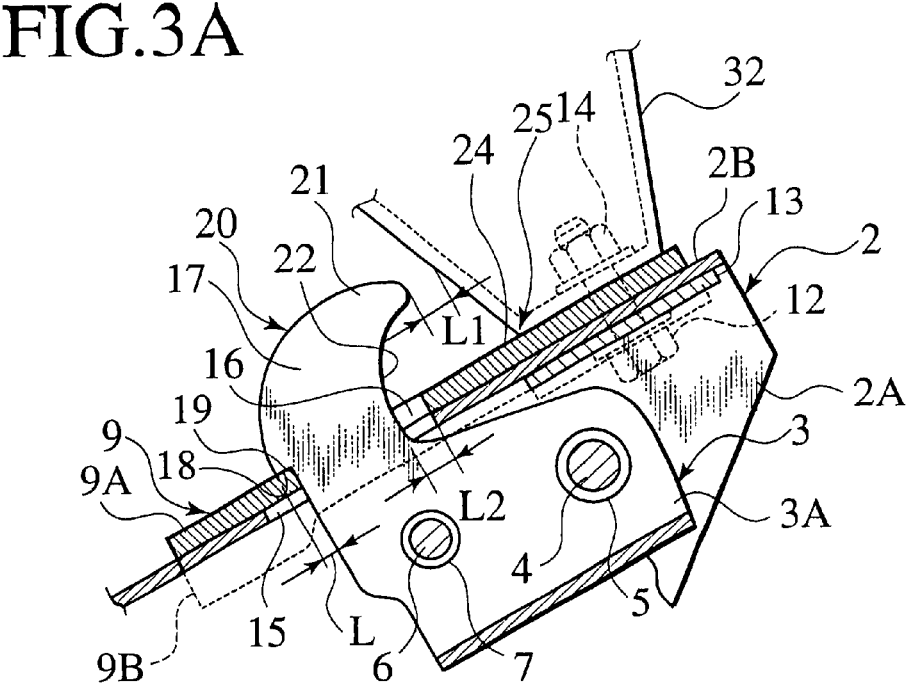
FIG. 3A is a cross sectional side view of an essential part of the brake pedal apparatus which is shown as remaining in its normal engagement position according to the embodiment.

During the normal driving state of the vehicle corresponding to a non-collision state, consequently, since the forward end portions 18, 18 of the respective elongated openings 16, 16 formed at the forward portions of the slide plate 9 is held in engagement with the cutout portions 19, 19 formed at the front edge portions of the pivot bracket 3, counterclockwise rotational movement of the pivot bracket 3 is restricted to allow a depressible stroke of the pedal arm 8 to be set at a predetermined position such that the pedal arm 8 is rotated around the center of the pedal shaft 6, thereby allowing a push rod 35 of a master vac. connected to the pedal arm 8 to achieve a usual master vac. operation, as shown FIGS. 2 and 3A. Incidentally in the embodiment, such a counterclockwise direction is viewed along the direction vertical to each of the sheet surfaces of FIGS. 2 to 4 from this side as a matter of convenience, and more specifically, the counterclockwise direction is that to rotate the pedal shaft 6 around the center of the pivot shaft 4 rearwardly downward of the vehicle as indicated by the arrow in FIG. 3B.

On the contrast, during the frontal collision of the vehicle, the pedal bracket 2 is moved in the longitudinal direction of the vehicle relative to the slide plate 9 and the bracket portion 32 of the vehicular body structural member 31 through the bolt insertion hole 10 of the pedal bracket 2 forming the impact absorbing section, thereby causing the upper projections 17, 17 of the pivot bracket 3 to approach the bracket portion 32 of the vehicular body structural member 31 owing to the rearward movement of the pedal bracket 2. With such a approach of the upper projections 17, 17, since the slide plate 9 fixed to the bracket portion 32 of the body structural member 31 allows the pedal bracket 2 to slide at the upper wall portion 2B in the rearward direction relative to the slide plate 9 and the bracket portion 32, the pivot bracket 3 disengages from the slide plate 9 to allow the pivot bracket 3 to pivotally rotate counterclockwise around the pivot shaft 4 shown in FIG. 3B to the second retaining position shown in FIG. 4 such that the pedal shaft 6 is rotated around the center of the pivot shaft 4 rearwardly downward of the vehicle and a depressible portion 8A of the pedal arm 8 is retracted relative to the pedal shaft 6 in the forward direction of the vehicle.

Figure 4:
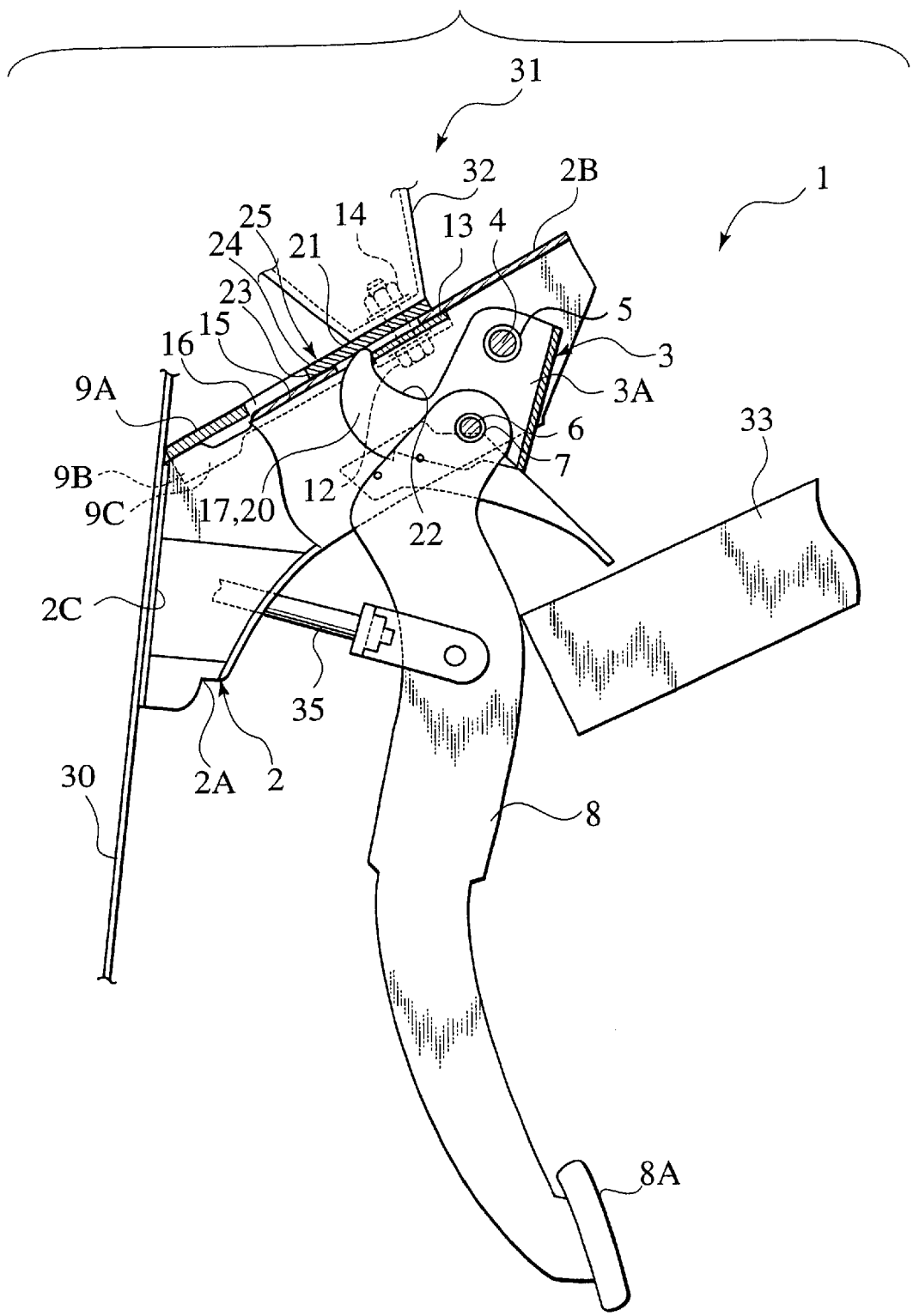
FIG. 4 is a cross sectional side view of the brake pedal apparatus for illustrating that a pivot bracket ceases its rotational movement according to the embodiment.

That is, as the pedal shaft 6 of the pedal arm 8 is moved in the rearward direction in the vehicle compartment, the depressible portion 8A of the pedal arm 8 is relatively shifted in the forward direction in the vehicle compartment, i.e., to the second retaining position shown in FIG. 4.

Figure 3B:
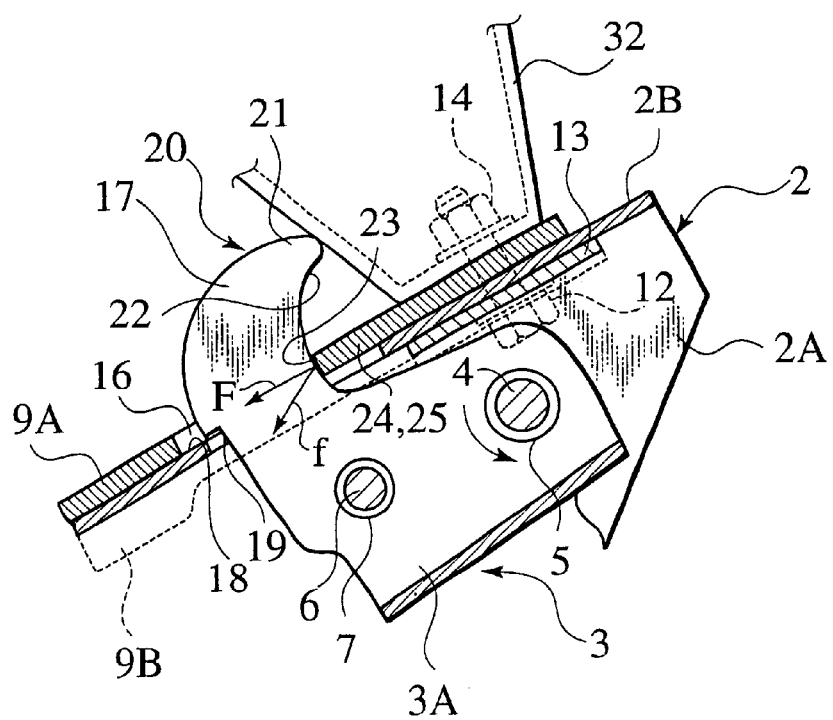
FIG. 3B is a cross sectional side view of an essential part of the brake pedal apparatus for illustrating its intermediate operating state during a frontal collision of the vehicle according to the embodiment.

Also, in the embodiment, as discussed above, the upper projections 17, 17 of the pivot bracket 3 form the rotational motion assisting section 20 which, when the upper projections 17, 17 are brought into abutting engagement with the bracket portion 32 of the body structural member 31, the upper projections 17, 17 promote the rotational movement of the pivot bracket 3 in the counterclockwise direction shown in FIG. 3B.

More specifically, the upper projections 17, 17 of the rotational motion assisting section 20 have rear distal ends 21, 21, respectively, which project in the rearward direction toward the bracket portion 32 of the body structural member 31 in the vicinity thereof. As viewed in FIG. 3A, the distance L1 between each rear distal end 21 and the bracket portion 32 of the body structural member 31 is preset to a value slightly larger than a biting margin L between each cutout portion 19 of the pivot bracket 3 and the engaging portion 18 of the slide plate 9, that is, between the engaging portions 18, 19.

Since the rotational motion assisting section 20 has rear edge portions 22, 22 each having a curved configuration such that, as viewed in FIG. 3B, when the slide plate 9 and the pedal bracket 2 are moved relative to each other and the pivot brackets 3, 3 are brought into abutting engagement with the rear edges 23, 23 of the respective elongated openings 16, 16, the rear edge portions 22, 22 of the rotational motion assisting sections 20 is exerted with a component force f inputted from the slide plate 9 and directed substantially in the downward direction to more effectively promote the rotational movement of the pivot bracket 3 in the counterclockwise direction shown in FIG. 3B.

It is a matter of course that the distance L2 between each of the rear edges of respective openings 15, 15 of the pedal bracket 2 (i.e., each of the rear edges of the elongated openings 16, 16 of the slide plate 9) and each of the rear edge portions 22, 22 of the rotational motion assisting section 20 is preset to a value slightly larger than the biting margin L between each cutout portion 19 of the pivot bracket 3 and the engaging portion 18 of the slide plate 9 to allow the rear edges 23, 23 of the elongated openings 16, 16 to be brought into abutting engagement with the rear edge portions 22, 22 of the rotational motion assisting section 20 after the cutout portions 19, 19 of the pivot bracket 3 and the engaging portions 18, 18 of the slide plate 9 have been certainly brought into disengagement from one another.

Still also, the slide plate 9 has a pair of the stopper sections 24, 24 which prevent the pivot bracket 3 from being rotated in a clockwise direction when, during the rotational movement of the pivot bracket 3 in the clockwise direction, the rotational motion assisting section 20 is exerted with the force in a direction opposite to the pivotal direction of the pivot bracket 3 due to interference with the pedal arm 8 and a peripheral part 33 shown in FIG. 4. Incidentally in the embodiment, such a clockwise direction is viewed along the direction vertical to each of the sheet surfaces of FIGS. 2 to 4 from this side as a matter of convenience, and more specifically, the clockwise direction is opposite to the above-noted counterclockwise direction.

More specifically, each stopper section 24 is formed on the slide plate 9 at a position rearward of the elongated openings 16, 16, respectively, to form concealment regions 25, 25 which serve to conceal the elongated openings 15, 15 of the pedal bracket 2 corresponding to relative movement of the slide plate 9 and the pedal bracket 2 when the pedal bracket 2 encounters the force exceeding the predetermined load in the rearward direction of the vehicle.

In particular, the elongated bolt insertion hole 10 of the pedal bracket 2 is formed in a length which is sufficient for permitting relative movement of the slide plate 9 and the pedal bracket 2 to allow the concealment regions 25, 25 of the slide plate 9 to fully close the elongated openings 15, 15 of the pedal bracket 2.

In the embodiment discussed above, since the rotational movement of the pivot bracket 3 is restricted with the slide plate 9 in the normal driving state of the vehicle, it is possible to carry out the usual master vac. operation through a push rod 35 coupled to the pedal arm 8 by rotating the pedal arm 8 around the center of the pedal shaft 6.

On the contrast, when the vehicle encounters a frontal collision, the pivot shaft 4 of the pivot bracket 3 is moved toward the fixed area between the slide plate 9 and the lower end wall of the body structural member 31 to allow the pivot bracket 3 to disengage from the slide plate 9 and to rotate the pivot bracket 3 with the pedal shaft 6 rearwardly downward around the center of the pivot shaft 4 in the direction shown by the arrow in FIG. 3B such that the depressible portion 8A of the pedal arm 8 is retracted toward the front side of the vehicle shown in FIGS. 3B to 4. As a result, even when the master vac. encounters rearward movement or even when the dash floor panel 30 is deformed toward the vehicle compartment such that the push rod 35 of the master vac. is moved rearward, it is possible to avoid the depressible position of the pedal arm 8 to be dislocated rearward to provide a differential feeling touch to a driver of the vehicle.

Further, owing to the rotational motion assisting section 20 formed at the upper portions of the pivot bracket 3 so as to project upward with a view to promoting the rotation of the pivot bracket 3 in the direction shown by the arrow in FIG. 3B when the pivot bracket 3 is brought into abutting engagement with the bracket portion 32 of the structural member 31 during the rotational movement of the pivot bracket 3, such rotational movement of pivot bracket 3 is forcedly enhanced.

Furthermore, the rotational motion assisting section 20 is formed in a position rearward of the engaging potions 18, 19 of the slide plate 9 and the pivot bracket 3, respectively, so as to project toward the bracket portion 32 of the body structural member 31 in such a manner that the distance between the rear distal end 21 of the rotational motion assisting section 20 and the bracket portion 32 of the body structural member 31 is preset to a value slightly larger than the biting margin of the engagement portions 18, 19. As a consequence, when the pivot bracket 3 is caused to disengage from the slide plate 9 during the frontal collision of the vehicle, the rotational motion assisting section 20 is quickly brought into abutting engagement with the bracket portion 32 of the body structural member 31, thereby enabling the pivot bracket 3 to pivotally rotate in the direction shown by the arrow in FIG. 3B in more rapid manner.

Also, the rear edge portions 22, 22 of the rotational motion assisting section 20 have the curved configuration and are arranged to encounter the component force f to be inputted from the slide plate 9 when the slide plate 9 and the pedal bracket 2 are moved relative to each other and the rear edge portions 22, 22 of the rotational motion assisting section 20 is brought into abutting engagement with the rear edges 23, 23 of the elongated openings 16, 16. This ensures the pivot bracket 3 to rotate in the direction shown by the arrow in FIG. 3B in more reliable manner.

Also, since the slide plate 9 has the stopper sections 24, 24 which are brought into engagement with the rotational motion assisting section 20 to prevent the pivot bracket 3 from being rotated in the reverse direction when the pivot bracket 3 is exerted with the reverse rotational force owing to the interference with the pedal arm 8 and the peripheral part 33 during the rotational movement of the pivot bracket 3, the pivot bracket 3 is capable of being prevented from rotating in the reverse direction even when the pivot bracket 3 is exerted with the reversal rotational force to cause the pivot bracket 3 to be returned to the initial position by some rare accident of the interference between the pedal arm 8 and the peripheral part 33 in the vehicle compartment during the collision of the vehicle.

More particularly, in the embodiment discussed above, owing to the provision of the impact absorbing section composed of the elongated bolt insertion hole 10 formed in the upper wall portion 2B of the pedal bracket 2 to allow the upper wall portion 2B of the pedal bracket 2 and the slide plate 9 to be surely fastened to the bracket portion 32 of the body structural member 31 and also to have the length sufficient for enabling the relative movement of the slide plate 9 and the pedal bracket 2 until the concealment regions 25, 25 of the slide plate 9 to fully close the elongated openings 15, 15 of the pedal bracket 2, the impact absorbing section can be constructed of a simplified structure at a low cost while allowing the stroke of the relative movement of the slide plate 9 and the pedal bracket 2 to be increased for prolonging the time interval for which a buckling deformation of the pedal bracket 2 appears, thereby providing a more stable operation of the pedal bracket 2.

Incidentally, in the illustrated embodiment, although the pedal bracket 2 has been shown as surely attached to the bracket portion 32 of the vehicle body formed at the lower portion of the dash upper panel, the present invention is of course not limited to such a structure and the pedal bracket 2 may be fixed to, for example, preferable another vehicular structural member such as a steering member which extends in a widthwise direction of the vehicle.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the accompanying claims.

Industrial Applicability

As described above, in the present invention, the impact absorbing section permits relative movement of the pivot bracket and the body structural member in a longitudinal direction of the vehicle when the pedal bracket encounters an external force directed rearward of the vehicle at a level beyond a predetermined load, in such a manner that the pivot bracket disengages from the slide plate to allow the pivot bracket to rotate about the pivot shaft while rotating the pedal shaft therewith rearwardly downward of the vehicle. Also, the rotational motion assisting section is normally held in an inoperative position and operable to be brought into abutting engagement with at least one of the body structural member and the slide plate to promote the rotational movement of the pivot bracket about the pivot shaft caused by the impact absorbing section. Owing to such a structure, the depressible position of the brake pedal can be substantially in a comfortable position for a driver to effectively avoid a differential feeling touch to be applied thereto. Therefore, a wide applicability of the brake pedal apparatus of the present invention is expected.

What is claimed is:

1. A brake pedal apparatus for a vehicle provided with a dash panel and a body structural member located upwardly rearward of the dash panel in the vehicle, comprising:

a pedal bracket having a side wall connected to the dash panel, an upper wall connected to an upper end of the side wall, and a pivot shaft mounted to the side wall, the upper wall being attached to the body structural member;

a pivot bracket pivotally supported on the pivot shaft and having a pedal shaft located forward of the pivot shaft in the vehicle;

a pedal arm pivotally supported on the pedal shaft;

a slide plate having an opening through which the pivot bracket protrudes, attached to the body structural member and located between the body structural member and the pedal bracket, the pivot bracket being normally held in engagement with the slide plate;

an impact absorbing section permitting relative movement of the pivot bracket and the body structural member, at which the slide plate is attached, in a longitudinal direction of the vehicle when the pedal bracket encounters an external force directed rearward of the vehicle at a level beyond a predetermined load, in such a manner that the pivot bracket disengages from the slide plate to allow the pivot bracket to rotate about the pivot shaft while rotating the pedal shaft therewith rearwardly downward of the vehicle; and a rotational motion assisting section formed on the pivot bracket to have a rear distal end projecting rearward of the vehicle and normally held in an inoperative position, the rotational motion assisting section being operable to be brought into abutting engagement with at least one of the body structural member and a rear edge of the opening of the slide plate to promote rotational movement of the pivot bracket about the pivot shaft caused by the impact absorbing section when the slide plate and the pivot bracket are moved relative to each other.

2. A brake pedal apparatus according to claim 1, wherein the side wall is composed of a pair of opposing side walls each of which is fixed to the dash panel, and the upper wall joined to upper ends of the opposing side walls to form a C-shaped configuration in cross section, and wherein the pivot shaft is mounted to the opposing side walls.

3. A brake pedal apparatus according to claim 1, wherein the pivot bracket has an upper projection, and the upper wall of the pedal bracket has an opening, and wherein the upper projection of the pivot bracket is normally protruded upward of the vehicle through the opening of the slide plate and the opening of the upper wall of the pedal bracket.

4. A brake pedal apparatus according to claim 3, wherein the upper projection of the pivot bracket has a cutout portion to normally engage with a front edge portion of the opening of the slide plate.

5. A brake pedal apparatus according to claim 3, wherein the rotational motion assisting section is provided on the upper projection of the pivot bracket.

6. A brake pedal apparatus according to claim 1, wherein the impact absorbing section is provided on the pivot bracket.

7. A brake pedal apparatus according to claim 6, wherein the impact absorbing section includes an elongated insertion hole through which a bolt attaching the pedal bracket to the body structural member is inserted.

8. A brake pedal apparatus according to claim 1, wherein the pivot bracket is normally held in engagement with the slide plate at an engaged portion and the rotational motion assisting section protrudes from the pivot bracket toward the body structural member at a position rearward of the engaged portion in the vehicle.

9. A brake pedal apparatus according to claim 8, wherein a distance between the rear distal end of the rotational motion assisting section and the body structural member is preset to a value slightly larger than a biting margin of the engaged portion.

10. A brake pedal apparatus according to claim 8, wherein the rotational motion assisting section includes at a rear edge portion thereof a curved configuration to allow the rear edge portion to be applied with a force from the slide plate when the slide plate and the pivot bracket are moved relative to each other, the force having a component in a downward direction of the vehicle.

11. A brake pedal apparatus according to claim 1, wherein the slide plate includes a stopper section, even if the pivot bracket encounters a force applied in a direction opposite to the rotational direction of the pivot bracket along which the pivot bracket rotates when the pedal bracket encounters the external force directed rearward of the vehicle at the level beyond the predetermined load, to be brought into abutting engagement with the rotational motion assisting section to prevent the pivot bracket from being rotated in a direction opposite to the rotational direction thereof.

12. A brake pedal apparatus according to claim 11, wherein the force applied in the direction opposite to the rotational direction of the pivot bracket is caused by interference between the pedal arm and a peripheral part existing in the vehicle.

13. A brake pedal apparatus according to claim 11, wherein the pedal bracket has an opening to allow the rotational motion assisting section to protrude upward of the vehicle therethrough, and wherein the stopper section of the slide plate includes an opening concealment section concealing the opening of the pedal bracket when the slide plate and the pedal bracket are moved relative to each other, while the pedal bracket encountering the external force directed rearward of the vehicle at the level beyond the predetermined load.

14. A brake pedal apparatus according to claim 13, wherein the upper wall of the pedal bracket has an elongated insertion hole, through which a bolt attaching the pedal bracket to the body structural member is inserted, having a length to permit relative movement of the slide plate and the pedal bracket until the opening concealment section of the slide plate conceals the opening of the pedal bracket.

15. A brake pedal apparatus according to claim 1, wherein a rod member of a master cylinder of the vehicle is connected to the pedal arm.

16. A brake pedal apparatus for a vehicle provided with a dash panel and a body structural member located upwardly rearward of the dash panel in the vehicle, comprising:

a pedal bracket having a side wall connected to the dash panel, an upper wall connected to an upper end of the side wall, and a pivot shaft mounted to the side wall, the upper wall being attached to the body structural member;

a pivot bracket pivotally supported on the pivot shaft and having a pedal shaft located forward of the pivot shaft in the vehicle;

a pedal arm pivotally supported on the pedal shaft;

a slide plate, having an opening through which the pivot bracket protrudes, attached to the body structural member and located between the body structural member and the pedal bracket, the pivot bracket being normally held in engagement with the slide plate;

permitting means for permitting relative movement of the pivot bracket and the body structural member in a longitudinal direction of the vehicle when the pedal bracket encounters an external force directed rearward of the vehicle at a level beyond a predetermined load, in such a manner that the pivot bracket disengages from the slide plate to allow the pivot bracket to rotate about the pivot shaft while rotating the pedal shaft therewith rearwardly downward of the vehicle; and promoting means for promoting rotational movement of the pivot bracket about the pivot shaft caused by the permitting means, the promoting means having a rear distal end projecting rearward of the vehicle and being operable to be brought into abutting engagement with at least one of the body structural member and a rear edge of the opening of the slide plate when the slide plate and the pivot bracket are moved relative to each other.

* * * * *